United States Patent [19]
Miyazaki et al.

[11] Patent Number: 5,677,624
[45] Date of Patent: Oct. 14, 1997

[54] ROLLING BEARING UNIT WITH ROTATING SPEED SENSOR

[75] Inventors: Hiroya Miyazaki; Junshi Sakamoto; Yoshihisa Ohnuki; Hayato Ohmi, all of Fujisawa; Masao Yamamoto, Takasaki, all of Japan

[73] Assignee: NSK Ltd., Japan

[21] Appl. No.: 609,446

[22] Filed: Mar. 1, 1996

[30] Foreign Application Priority Data

Mar. 3, 1995 [JP] Japan ................. 7-044418

[51] Int. Cl.$^6$ .............. G01P 3/44; G01P 3/488; F16C 32/00
[52] U.S. Cl. ............ 324/173; 324/174; 324/207.22; 384/448
[58] Field of Search ................ 324/173, 174, 324/207.15, 207.16, 207.22, 207.25; 310/168; 384/448

[56] References Cited

U.S. PATENT DOCUMENTS 5,166,611  11/1992  Kujawa, Jr. et al. ........ 324/207.22 X
5,550,467  8/1996   Goossens ................... 324/173

FOREIGN PATENT DOCUMENTS 0 693 689  1/1996  European Pat. Off. .
2697597    5/1994  France ................... 384/448

Primary Examiner—Gerard R. Strecker
Attorney, Agent, or Firm—Evenson, McKeown, Edwards & Lenahan P.L.L.C.

[57] ABSTRACT

A rolling bearing unit with rotating speed sensor comprising a stationary outer ring member having an outer ring raceway, a rotatable inner ring member having an inner ring raceway, a plurality of rolling elements rotatably provided between the outer ring raceway and the inner ring raceway, a cylindrical magnetic tone wheel fixed to the inner ring member and, having a cylindrical fixing portion fitted onto the inner ring member, a cylindrical detecting portion provided concentric with the cylindrical fixing portion and formed with rotating cutouts, and a stepped portion provided between the cylindrical fixing portion and the cylindrical detecting portion, and a cover comprising a synthetic resin block and a metal portion to be securely mounted to the outer ring member, and an annular sensor embedded in the synthetic resin block so as to be opposed to the tone wheel, and the cylindrical fixing portion having an inner peripheral face on which a plurality of engagement portions are arranged in a single circle to project radially inwards from the inner peripheral face, and to be abutted to the end face of the inner ring member, so that the tone wheel is positioned with reference to the inner ring member.

2 Claims, 8 Drawing Sheets

ROLLING BEARING UNIT WITH ROTATING SPEED SENSOR

FIELD OF THE INVENTION

This invention is related to a rolling bearing unit with rotating speed sensor to rotatably support a vehicle wheel with respect to the suspension apparatus and to detect the rotating speed of the vehicle wheel.

DESCRIPTION OF THE PRIOR ART

Various constructions for a rolling bearing unit with rotating speed sensor to detect rotating speed of a vehicle wheel are known up to now in order that the vehicle wheel is supported with respect to the suspension freely rotatably while an anti-lock brake system (ABS) or a traction control system (TCS) is controlled.

The rotating speed sensor which is installed in the rolling bearing unit with rotating speed sensor has a tone wheel which rotates with the vehicle wheel and a sensor which outputs a signal changing in proportion to the rotating speed of the tone wheel.

Various types of tone wheels and sensors are known up to now. The rotating speed sensor of the passive type which uses the tone wheel made of magnetic material such that the voltage generated in the coil of the sensor changes according to the rotation of the tone wheel is used widely, because it does not use expensive components.

The passive type of the rotating speed sensor which comprises an annular sensor to make the output of the sensor larger as shown, for example, in HATSUMEI KYOKAI Technical Report Publication No. 94-16051 is known in the prior art.

Figure 6:
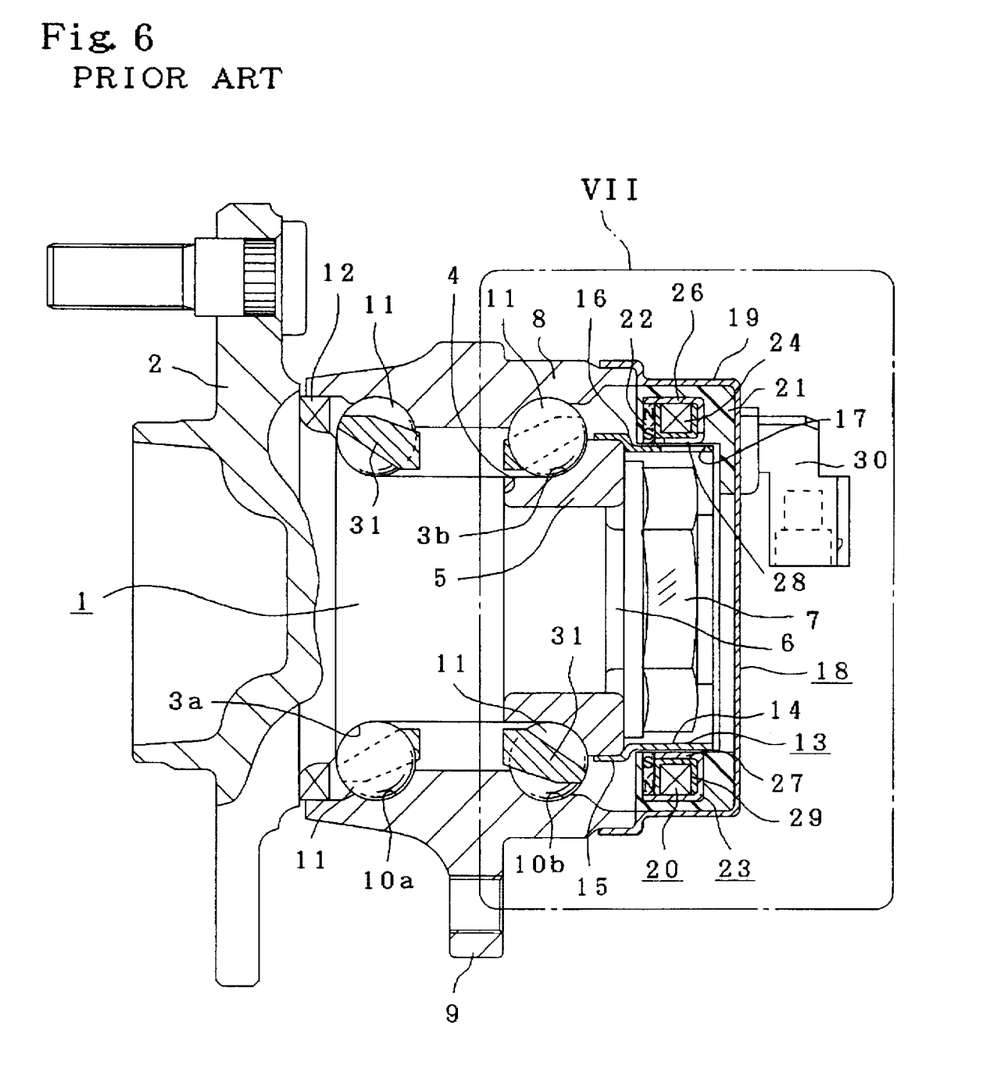
FIG. 6 is a cross sectional view of a prior art rolling bearing unit with rotating speed sensor.
Figure 7:
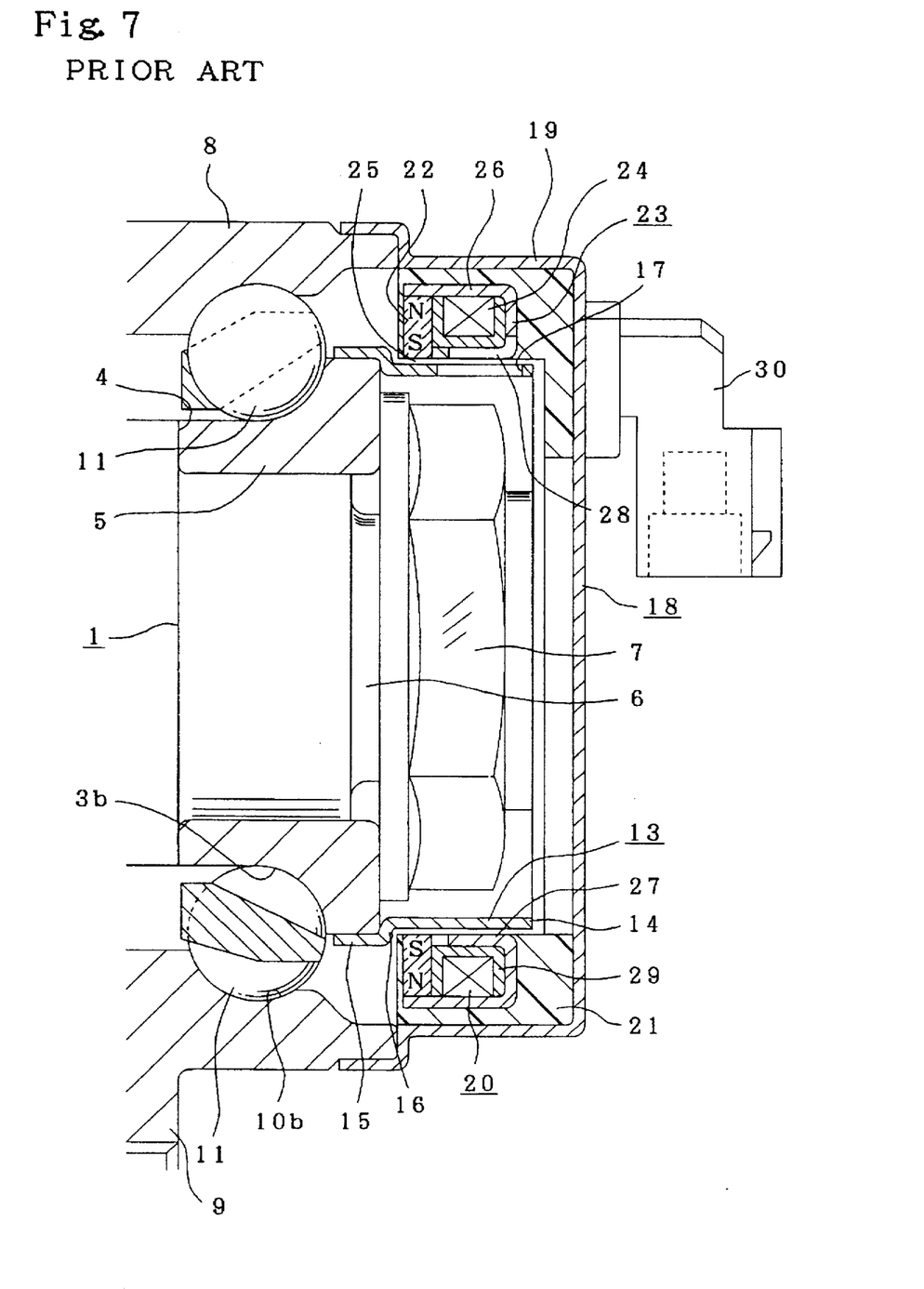
FIG. 7 is a cross sectional view of portion VII in FIG. 6.

FIGS. 6 and 7 show the rolling bearing unit with rotating speed sensor as disclosed in this Technical Report Publication.

A hub 1 has an axially outer end portion which is formed with a flange 2 for wheel fixture on its outer peripheral face, a mid-portion which is formed with an inner ring raceway 3a and a stepped portion 4 on its outer peripheral face, and an axially inner end portion which has an inner ring member 5 provided on its outer peripheral face.

The term "axially outer" in the specification means the outer side in a widthwise direction when installed in the vehicle; left in figures, and the term "axially inner" means the center side in a widthwise direction when installed in the vehicle; right in figures.

The inner ring member 5 is formed with an inner ring raceway 3b and externally fitted to the outer peripheral face of the hub 1 with an axially outer end face thereof abutted against the stepped portion 4.

A male-threaded portion 6 is formed on the axially inner end portion of the hub 1. The inner ring member 5 is fixed at a predetermined location on the outer peripheral face of the hub 1 by means of a nut 7 which is threaded onto the threaded portion 6 and tightened, thus constituting an inner ring assembly together with the hub 1.

There is also the case where, instead of directly forming the inner ring raceway 3a on the outer peripheral face of the hub 1, it is formed as an inner ring member (not shown) separate from the hub 1, and externally fitted to the hub 1 together with the inner ring member 5.

An outer ring member 8 located around the hub 1 has a mid-portion which is provided with an attachment portion 9 on an outer peripheral face thereof, for fixing the outer ring member 8 to a suspension unit (not shown).

An inner peripheral face of the outer ring member 8 is formed with outer ring raceways 10a, 10b opposite to the inner ring raceways 3a, 3b respectively.

A plurality of rolling elements 11, specifically balls, are respectively provided between the two inner ring raceways 3a, 3b and the pair of outer ring raceways 10a, 10b, so that the hub 1 is rotatable inside the outer ring member 8.

In the case of a hub unit for heavy vehicles, tapered rollers are used for the rolling elements instead of the balls 11 shown in FIGS. 6 and 7.

A seal ring 12 is fitted between the inner peripheral face at the axially outer end of the outer ring member 8, and the outer peripheral face of the hub 1, to cover the opening at the axially outer end of the space in which the plurality of rolling elements 11 are provided between the inner peripheral face of the outer ring member 8 and the outer peripheral face of the hub 1.

A tone wheel 13 has a base end portion (left end in FIGS. 6 and 7) which is externally fixed to a portion on an axially inner end of the inner ring member 5 which is spaced away from the inner ring raceway 3b.

The tone wheel 13 is made of magnetic metal plate such as steel plate, and is entirely annular or short-cylindrical. The tone wheel 13 comprises a smaller-diameter portion 14 for detection and a larger-diameter portion 15 for fixing that are continuous through a stepped portion 16 and coaxial with each other. This kind of tone wheel 13 is fixed an ported by the inner ring member 5, such that the larger-diameter portion 15 is fitted around the outer peripheral face on the axially inner end portion of the inner ring member 5, so that the stepped portion 16 comes in contact with the axially inner edge of the inner ring member 5. Therefore, the smaller-diameter portion is supported so that it is coaxial with the inner ring member 5.

There are several through holes 17 formed around the smaller-diameter portion 14 at equal intervals in the circumferential direction to form a first or rotatable cut-out portion where the magnetic characteristics change alternately at equal intervals in the circumferential direction.

These through holes 17 are identical in shape and specifically rectangular shaped to extend in the axial direction (left and right in FIGS. 6 and 7). Only the cross portion of one of the through holes 17 is shown in the figures for simplicity.

An opening portion at the axially inner end portion of the outer ring member 8 is covered with a cover 18 made for example by deep drawing a metal sheet such as stainless steel plate, or aluminum alloy plate into the form of a bottomed cylinder.

An annular synthetic resin block 21 in which is embedded an annular sensor 20 is fixed and retained within the cylindrical portion 19 of the cover 18. This sensor 20 comprises a permanent magnet 22, a stator 23 made of magnetic material such as steel plate, and a coil 24. By embedding the permanent magnet 22, stator 23 and coil 24 in the synthetic resin block 21, the sensor 20 can be made generally annular.

Of these components which make up the sensor 20, the permanent magnet 22 is formed in a generally annular or circular ring shape and magnetized so that its magnetic orientation is in the radial direction. The inner peripheral face of this permanent magnet 22 is faced, through a small clearance 25, to the outer peripheral face of a base portion of the smaller diameter portion 14 of the tone wheel 13 where the through holes 17 are not formed.

The stator 23 is formed in a generally annular shape and has a radially outer cylindrical portion 26 and a radially inner cylindrical portion 27 connected to each other through a radial portion in a substantially J-shaped cross portion. The inner peripheral face on the axially outer end of the radially outer cylindrical portion 26 of the stator 23 is very near or comes in contact with the outer peripheral face of the permanent magnet 22. Moreover, the inner peripheral face of the radially inner cylindrical portion 27 of the stator 23 is faced to a tip portion of the tone wheel 13 where the through holes 17 are formed.

Furthermore, a second or fixed cut-out portion having a plurality of notches 28 with an axial open end is formed around the radially inner cylindrical portion 27 of the stator 23, so that the notches 28 are located around the cylindrical portion 27 circumferentially with the same pitch as the through holes 17. This pitch is referred to as center-angle pitch. Accordingly, the radially inner cylindrical portion 27 is formed so that it is comb-toothed.

The coil 24 is formed by winding a conductive wire around a non-magnetic bobbin 29 so that it is annular shaped, and it is located on the inner peripheral side of the radially outer cylindrical portion 26 of the stator 23. The electromotive force (emf) generated in this coil 24 is output from a connector 30 that protrudes from the outside surface of the cover 18.

When using the rolling bearing unit with rotating speed sensor constructed as described above, as the tone wheel 13 rotates with the hub 1, the density of the magnetic flux flowing in the stator 23, which is faced to the tone wheel 13, changes, so that the voltage generated in the coil 24 changes at a frequency that is proportional to the rotational speed of the hub 1. The theory behind the change of voltage generated in the coil 24 due to the change in density of the magnetic flux flowing in the stator 23 is the same as that applied for rotating speed sensor that have been widely used in the prior art.

The reason that the density of the magnetic flux flowing in the stator 23 changes due to the rotation of the tone wheel 13 is described below.

The through holes 17 formed around the tone wheel 13 and the notches 28 formed around the stator 23 have the same pitch, so that as the tone wheel 13 rotates, there are moments when they are all faced to each other at the same time. At the moment when these holes 17 and notches 28 are faced to each other, the magnetic column portions located between each pair of adjacent holes 17 and the magnetic tongue-shaped portions located between each pair of adjacent notches 28 are faced to each other through a small clearance 25 between them. When the magnetic column portions and magnetic tongue-shaped portions are faced to each other, the density of the magnetic flux flowing between the tone wheel 13 and the stator 23 is high.

In contrast to this state, when the through holes 17 and notches 28 are half out of phase, the density of the magnetic flux flowing between the tone wheel 13 and the stator 23 becomes low. In other words, in this state, the through holes 17 formed around the tone wheel 13 are faced to the tongue-shaped portions, while at the same time, the notches 28 formed around the stator 23 are faced to the column portions. When the column portions are faced to the notches 28 and the tongue-shaped portions are faced to the through holes 17, there is a comparatively large gap or clearance between the tone wheel 13 and the stator 23 generally in the circumference. In this state, the density of the magnetic flux flowing between the tone wheel 13 and the stator 23 becomes low. As the result, the voltage generated in the aforementioned coil 24 changes proportionally with the rotational speed of the hub 1.

By using a sensor 20 like described above, the output voltage generated in the coil 24 changes with a frequency proportional to the rotational speed of the hub 1. There is an annular, existing space in the opening end portion of the outer ring member 8. It is possible to utilize this annular limited space for installing the sensor 20 to make the output of the sensor 20 sufficiently large enough to reliably detect the rotational speed of the vehicle wheel rotating together with the hub 1.

The permanent magnet 22, the stator 23 and the coil 24, which make up the sensor 20 are all formed in an annular shape that entirely surrounds the tone wheel 13. Since the magnetic flux that comes from the permanent magnet 22 flows all the way around the stator 23, the amount of magnetic flux that flows generally through the stator 23 can be made sufficiently large enough. Thus the change in voltage on the coil 24 that corresponds to the change in density of the magnetic flux passing through the stator 23, can be made large.

The prior art rotating speed sensor having the annular sensor 20 can have a larger output than those having the rod shaped sensor which had been known in the art.

However, in order that the rotating speed sensor is so small in size as to be installed in a compact car with an enough sensor output maintained, there are some points to be improved as follows:

A simple way to increase the output of the sensor 20 for secure detection of the rotating speed of the vehicle wheel is to enlarge the sensor 20.

However, it is difficult to make the sensor 20 larger in the sensor 20 of the bearing unit with rotating speed sensor for use in a compact car, because it is not desirable to increase the radial or axial direction of the sensor 20 in the compact car.

Therefore it is necessary to utilize the existing limited space in the unit, without increasing the radial and axial dimensions of the sensor, to increase the output of the sensor in the rolling bearing unit for use in the compact car.

Specifically, in FIGS. 6 and 7 where the sensor 20 is faced to the tone wheel 13, so that as the tone wheel 13 rotates, the voltage generated in the coils of the sensor 20 changes, it is necessary to increase the peripheral speed of the part of the tone wheel 13 that is faced to the sensor 20 in order to increase the output of the sensor 20. To increase this peripheral speed of the portion of the tone wheel 13, it is necessary to increase the diameter of the tone wheel 13, and accordingly it is necessary to increase in size the sensor 20 that is provided outside the tone wheel 13.

In regards to this, if the diameter of the sensor 20 is increased, the whole rotating speed sensor is enlarged, so that it is difficult to install the sensor in a compact car, and that the whole length of the conductive wire of the coil 24 becomes longer even with the same number of windings.

As the whole length of the conductive wire is longer, the resistance of the conductive wire is larger, which is against the concept of increasing the output of the sensor 20.

Figure 8:
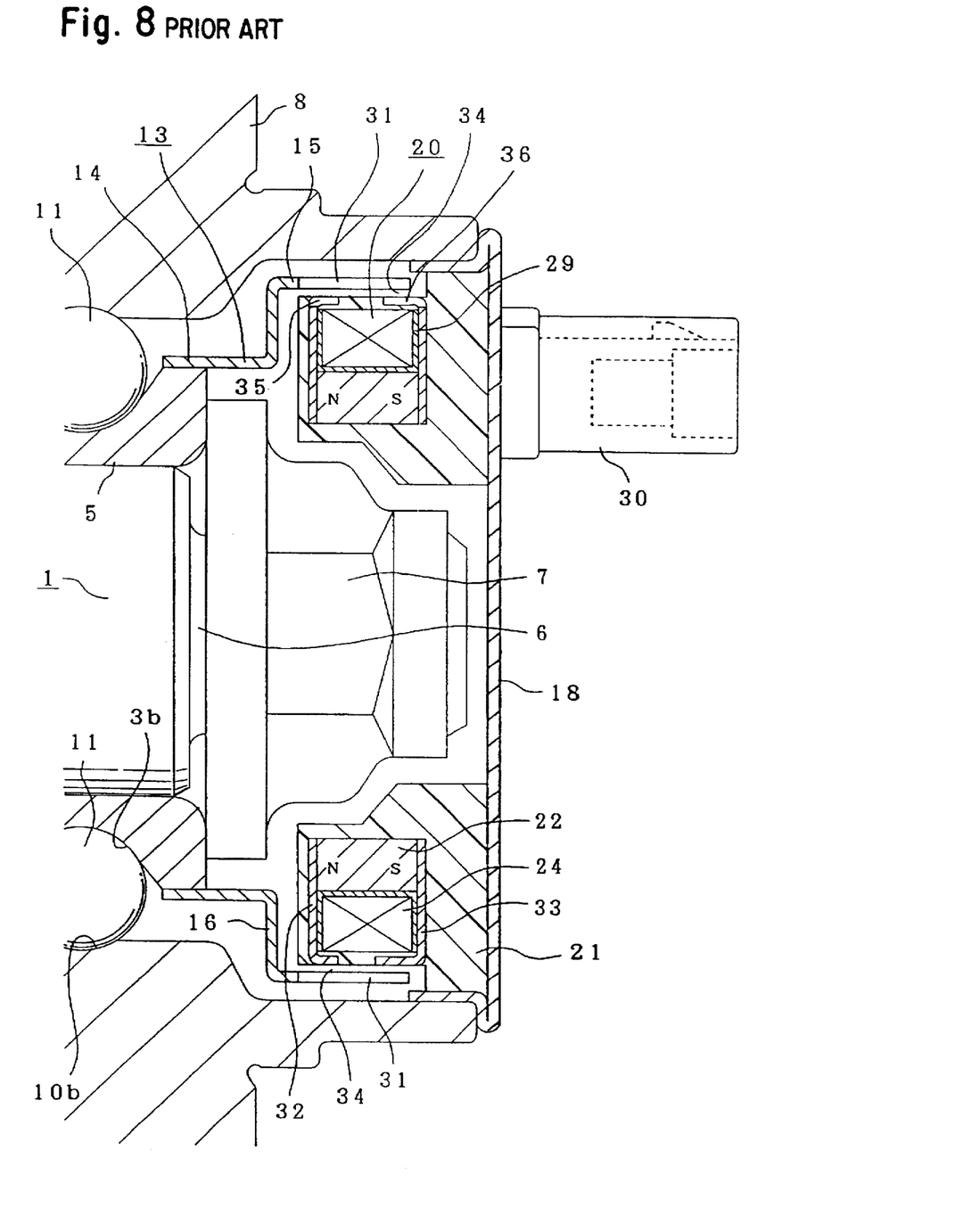
FIG. 8 is a cross sectional view of the rolling bearing unit disclosed in JP Patent Application No. H7-29560, similar to FIG. 7.

In the structure as in FIG. 8 where the sensor 20 is located radially inside the tone wheel 13 as detailed in JP Patent Application H7-29560, the peripheral speed of the tone wheel 13 is increased due to its relatively larger diameter as compared to a rolling bearing unit with a tone wheel arranged radially inside of a sensor, while the pitch of the through holes 17 is increased, and the number of windings of the conductive wire is increased without increasing the total length of the conductive wire so as to increase the output of the sensor 20.

The rotational speed sensor of FIG. 8 comprises a tone wheel 13 and a sensor 20. The tone wheel 13 is formed in a generally cylindrical shape from a magnetic metal plate such as steel plate, and comprised of a cylindrical fixing portion or smaller diameter portion 14 and a cylindrical detecting portion or larger diameter portion 15. The axially inner end rim of the smaller diameter portion 14 is connected to the axially outer end rim of the larger diameter portion 15 by a stepped portion 16 giving a crank shape in cross portion.

The tone wheel 13 is secured to the inner ring 5 by press fitting the smaller diameter portion 14 onto the axially inner end portion of the inner ring 5.

With the tone wheel 13 fixed to the inner ring 5 in this manner, the larger diameter portion 15 is located around the periphery of the nut 7 which clamps the inner ring 5.

Cut-outs 31 in the rotating cutout portion are formed in the larger diameter portion 15 at even spacing around the circumference, with tongue portions of magnetic material between pairs of circumferentially adjacent cut-outs 31. The larger diameter portion 15 is thus formed with comb like teeth. The cut-outs 31 can be formed only in the radially inner portion of the larger diameter portion 15. In this case, the larger diameter portion 15 has recesses and lands like an internal gear shape where the recesses form the rotating cut-out portion. On the contrary, the through holes 17 in the prior art construction as in FIGS. 6 and 7 can be made for the rotating cut-out portion.

The sensor 20 comprises a permanent magnet 22, first and second stators 32, 33 formed from a magnetic metal plate with an L-shape in cross portion, and a coil 24. The permanent magnet 22, first and second stators 32, 33 and coil 24 are respectively formed in an annular shape and embedded in a synthetic resin 21.

The permanent magnet 22 is magnetized in the axial direction (left/right direction in FIG. 8) around the whole periphery, with the magnetized direction unchanged therearound.

The axially inner face (right face in FIG. 8) of a radially inner, base end portion of the first stator 32 is abutted against the axially outer end face (left end face in FIG. 8) of the permanent magnet 22, while an outer peripheral face of a radially outer, tip end portion of the first stator 32 is faced to a central portion on the inner peripheral face of the larger diameter portion 15, across a small gap 34.

Moreover the axially outer face (left face in FIG. 8) of a radially inner, base end portion of the second stator 33 is abutted against the axially inner end face (right end face in FIG. 8) of the permanent magnet 22, while an outer peripheral face of a radially outer, tip end portion of the second stator 33 is faced to the inner peripheral face of the tip end portion (right end in FIG. 8) of the larger diameter portion 15, also across the small gap 34.

The radially outer, tip end portions of the first and second stators 32, 33 are formed with the fixed side cut-out portion having cut-outs 35, 36, in a comb like teeth shape respectively. The pitch (central angle pitch) of the cut-outs 31 formed in the larger diameter portion 15 of the tone wheel 13 is made the same as that of the respective cut-outs 35, 36. Moreover, the phases of the cut-outs 35, 36 formed in the first and second stators 32, 33 are made the same to each other, such that the cut-outs 35 are aligned with the cutouts 36.

A coil 24 is provided in the region surrounded by the outer peripheral face of the permanent magnet 22, and the respective side faces of the first and second stators 32, 33.

A voltage which changes with a frequency proportional to the rotational speed of the tone wheel 13 is produced in the coil 24 depending on the change in the density of the magnetic flux flowing in the permanent magnet 22, first stator 32 and second stator 33.

One part of the outer ring member 8 of the rolling bearing unit extends as far as the region around the nut 7. In addition, the cover 18 closing the end of the outer ring 8 is simplified in shape so as to reduce the amount of deformation when producing the cover 18 from a flat metal plate, that is, for easy processing. Further, the connector 30 is axially projected from the cover 18.

In the rolling bearing unit with rotating speed sensor as constructed above, the larger diameter portion 15 of the tone wheel 13 faced to the outer peripheral face of the sensor 20 can have a faster peripheral speed to increase the output of the sensor 20, due to its relatively larger diameter as compared to a rolling bearing unit with a tone wheel arranged radially inside of a sensor.

In addition, there is no need of making larger the diameter of the coil 24 of the sensor 20. Accordingly, the whole length of the conductive wire of the coil 24 is not excessive thus preventing the increase in resistance of the conductive wire and the decrease in output of the sensor.

In the construction of FIG. 8, as the tone wheel 13 rotates, the magnetic reluctance changes simultaneously at two locations, that is, between the outer peripheral face of the first stator 32 and the inner peripheral face of the larger diameter 15, and between the outer peripheral face of the second stator 33 and the inner peripheral face of the larger diameter portion 15.

Accordingly, the change in magnetic reluctance corresponding to the rotation of the tone wheel 13 is made larger, so that the output of the sensor 20 is further increased.

In the case of the rolling bearing unit with rotating speed sensor as mentioned in the copending JP Patent Application No. H7-29560, the output is increased compared with the prior art structure explained at the outset.

However, there are some points to be solved with respect to the structure for mounting the tone wheel 13 to the inner ring 5.

Specifically, in the prior art structure as shown in FIGS. 6 and 7, the larger diameter portion 15 of the tone wheel 13 is fitted onto the axially inner end portion of the inner ring 5 with the stepped portion 16 abutted to the end edge portion of the inner ring 5, so that the tone wheel 13 is precisely positioned with respect to the inner ring 5.

In the structure of FIG. 8, however, the smaller diameter portion 14 of the tone wheel 13 is fitted onto the axially inner end portion of the inner ring 5, and the stepped portion 16 is never abutted to the end edge portion of the inner ring 5.

Therefore, it is impossible to position precisely the tone wheel 13 based on the engagement of the stepped portion 16 with the inner ring 5.

Consequently, when assembling the structure as shown in FIG. 8, a tool for pressing the smaller diameter portion 14 of the tone wheel 13 toward the inner ring 5 has a portion abutted to the axially inner end face of the outer ring 8, so that the pressing amount for the smaller diameter portion 14 with reference to the inner ring 5 is controlled.

Thus, it is possible to adjust the mount position by mounting the tone wheel 13 to the inner ring 5. However, after assembling, any member e.g. the cover 18 may bump the tone wheel 13, and in this case, the mount position of the tone wheel 13 may be displaced.

Incidentally, it is possible to provide an inner ring member which has a stepped shoulder portion comprising a larger diameter portion and a smaller diameter portion such that the tone wheel is fitted into the smaller diameter portion with the tip end of the cylindrical fitting portion of the tone wheel abutted to the stepped portion of the shoulder portion. However, this construction is higher in processing costs and larger in width dimension so as not to provide a compact one.

The position relationship between the tone wheel 13 and the sensor 20 is very subtle, e.g. the clearance is about 0.5 mm in width between them. Accordingly, a slight displacement of the mount position of the tone wheel 13 will damage the performance of the rotating speed sensor.

SUMMARY OF THE INVENTION

One object of the present invention is to provide a rolling bearing unit with rotating speed sensor solving the problems as mentioned above.

Another object of the present invention is to provide a rolling bearing unit with rotating speed sensor comprising a stationary outer ring member having an open end portion and an inner peripheral face formed with an outer ring raceway thereon, a rotatable inner ring member having an end portion and an outer peripheral face opposed to the inner peripheral face and formed with an inner ring raceway thereon, a plurality of rolling elements rotatably provided between the outer ring raceway and the inner ring raceway, a cylindrical magnetic tone wheel fixed to the end portion of the inner ring member and having a surface portion circumferentially formed with rotating cutouts with a uniform space therebetween, a cover securely mounted to the open end portion of the outer ring member and having a synthetic resin block held therein, and an annular sensor embedded in the synthetic resin block so as to be opposed to the tone wheel, the tone wheel having a cylindrical fixing portion fitted onto the end portion of the inner ring member and having an end edge, a cylindrical detecting portion provided concentric with the cylindrical fixing portion and having an end edge and a peripheral face on which the rotating cutouts are formed, and a stepped portion provided between the end edge of the cylindrical fixing portion and the end edge of the cylindrical detecting portion, the cylindrical fixing portion having an inner peripheral face on which at least one engagement portion is arranged in a single circle to project radially inwards from the inner peripheral face, and the engagement portion having one side face abutted to the end face of the inner ring member, so that the tone wheel is positioned with reference to the inner ring member.

PREFERRED EMBODIMENT OF THE INVENTION

The present invention provides a rolling bearing unit with rotating speed sensor which comprises, similar to the prior art rolling bearing unit with rotating speed sensor as previously mentioned, a stationary outer ring member having an inner peripheral face on which an outer raceway is formed, a rotatable inner ring member having an outer peripheral face opposed to the inner peripheral face of the outer ring member, on which an inner ring raceway is formed, a plurality of rolling elements rotatably provided between the outer ring raceway and inner ring raceway, a cylindrical magnetic tone wheel fixed to one end portion of the inner ring member and having a surface portion on which a plurality of rotating cut-outs are circumferentially provided with a uniform spaced therebetween, a cover fixed to the open end portion of the outer ring member, and an annular sensor embedded in the synthetic resin block held in the cover so as to be opposed to the tone wheel.

The tone wheel has a cylindrical portion for fixture fitted onto the end portion of the inner ring member, a cylindrical portion for detection coaxial with the cylindrical portion for fixture and having a peripheral face on which the cut-outs are formed, and a stepped portion provided between one end edge of the cylindrical portion for detection and one end edge of the cylindrical portion for fixture.

The rolling bearing unit with rotating speed sensor of this invention has an engagement portion which is extended on the same circle and projected radially inward of the inner peripheral face of the cylindrical portion for fixing.

The engagement portion has an axially outer side face abutted to the axially inner end face of the inner ring assembly, so that the tone wheel can be precisely positioned with reference to the inner ring assembly.

The operation of the rolling bearing unit with rotating speed sensor of the present invention for rotatably supporting the vehicle wheel with respect to the suspension apparatus or for detecting the rotating speed of the vehicle wheel is substantially the same to the structures of the prior art invention and of the copending JP Patent application mentioned above.

The rolling bearing unit with rotating speed sensor of the present invention is characterized in that the one side face of the engagement portion is abutted to the end face of the inner ring assembly faced to the tone wheel, so that the tone wheel can be precisely positioned with reference to the inner ring assembly.

Figure 1:
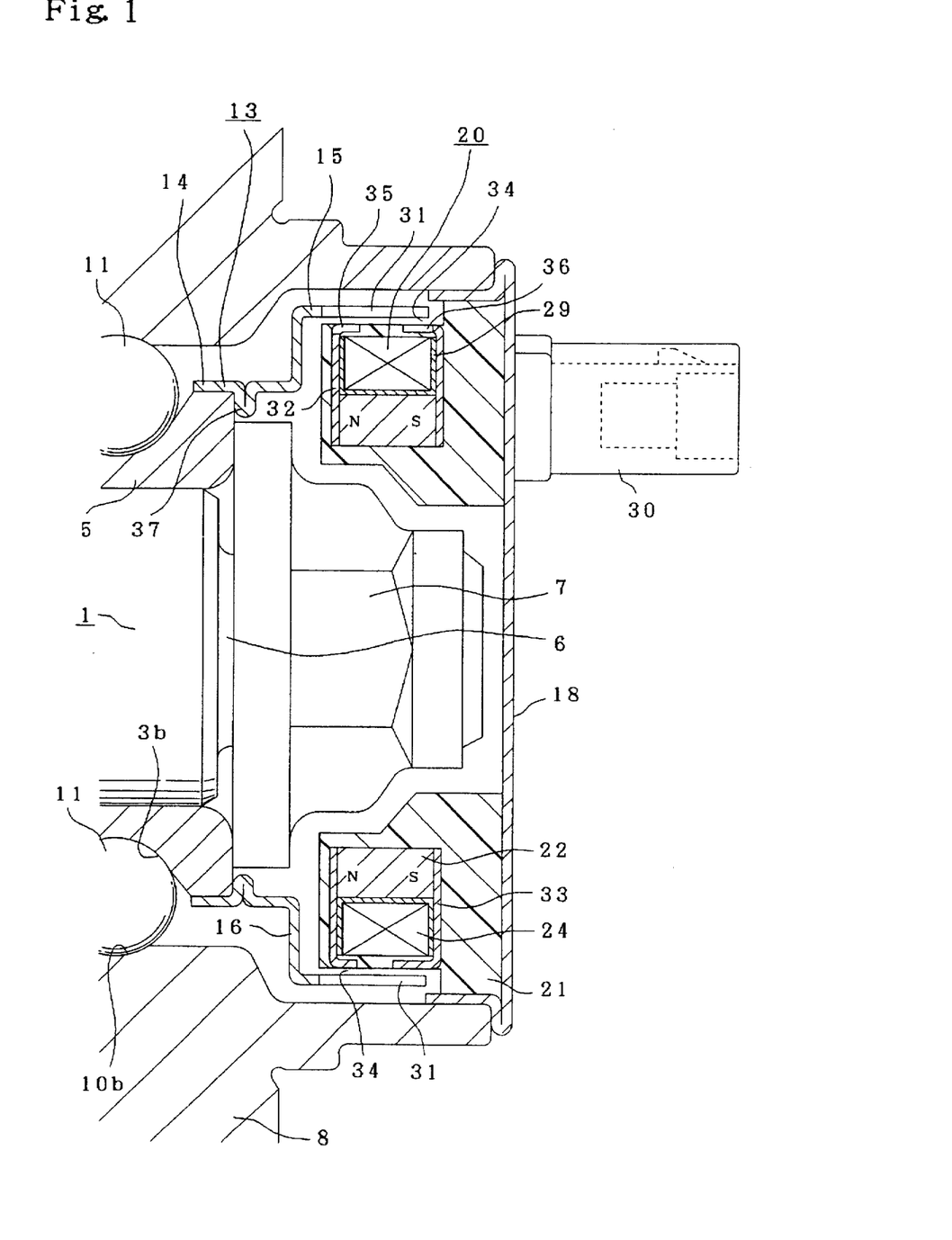
FIG. 1 is a cross sectional view of part of a rolling bearing unit showing a first embodiment of the present invention.

Now, FIG. 1 shows a first embodiment of the present invention. This rolling bearing unit with rotating speed sensor of the present invention is characterized in that the inner ring member 5 associated with the hub 1 to form the inner ring assembly has an end portion onto which the tone wheel 13 is precisely and securely positioned.

The construction of the rolling bearing unit is substantially the same to that of the prior art rolling bearing unit as mentioned previously, while the construction of the sensor 20 is substantially the same to that of the copending JP Patent application as mentioned previously.

Therefore, the details of the bearing unit and sensor 20 are omitted or simplified with like reference numerals used for like members.

The following description is directed to the tone wheel 13 corresponding to the present invention, while HATSUMEI KYOKAI Technical Patent Publication No. 94-16051 and JP Patent Application No. H7-29560 are incorporated in this specification by reference.

The tone wheel 13 is made of magnetic metal plate such as steel plate, and is processed by plastic working in an entirely annular or short-cylindrical shape. The tone wheel 13 comprises in a crank shape in cross section a smaller-diameter portion 14 for fixing and a larger-diameter portion 15 for detecting, a stepped portion 16 for continuously connecting the axially inner end edge of the smaller-diameter portion 14 to the axially outer end edge of the larger diameter portion 15.

This tone wheel 13 is formed with an inwardly flanged portion or engagement portion 37 on the inner peripheral face of the smaller-diameter portion 14.

The flange portion or engagement portion 37 is formed by deforming through buckling radially inwards and axially crushing part of the magnetic metal plate for the tone wheel 13.

In order to support the tone wheel 13 with the inner ring 5, the smaller diameter section 14 is forced to the axially inner end portion of the inner ring 5 until the axially outer side face of the flange portion 37 is abutted to the axially inner end face of the inner ring 5. The tone wheel 13 having the flange portion 37 is formed with predetermined dimensions and sizes to produce the uniform products, and can be precisely positioned with reference to the inner ring 5, by abutting the axially outer end face of the flange portion 37 to the axially inner end face of the inner ring 5.

Once the tone wheel 13 is mounted to the inner ring 5, the tone wheel is not displaced in mount position even if bumped by the cover 18 and other members.

When mounting the smaller diameter section 14 to the end portion of the inner ring 5, the pressing face of the pressing tool is abutted to the axially inner side face of the flange portion 37 without damaging the tone wheel 13 in the pressing operation.

Specifically, the one side face or axially outer side face of the flange portion 37 is adjusted at right angles with respect to the central axis easily by adjusting the plastic working device, so that whirling is prevented.

In addition, the plane defined by the peripheral edge of the axially inner end face of the inner ring is adjusted at right angles with respect to the central axis of the inner ring 5 easily by the adjustment of the apparatus for producing the inner ring 5.

Generally, the inner ring 5 is produced with the end face precisely at right angles with reference to the axis.

So long as these portions are securely set at right angles, the central axis of the tone wheel 13 does precisely coincide with the central axis of the inner ring 5 in the state where the one side face of the tone wheel 13 is abutted to the end face of the inner ring 5 faced to the tone wheel 13.

Accordingly, the larger diameter portion 15 of the tone wheel 13 is prevented from whirling, that is, the peripheral face of the portion 15 is prevented from displacing in a radial direction, as the inner ring 5 rotates. Consequently, the output of the sensor 20 is stable.

Figure 2:
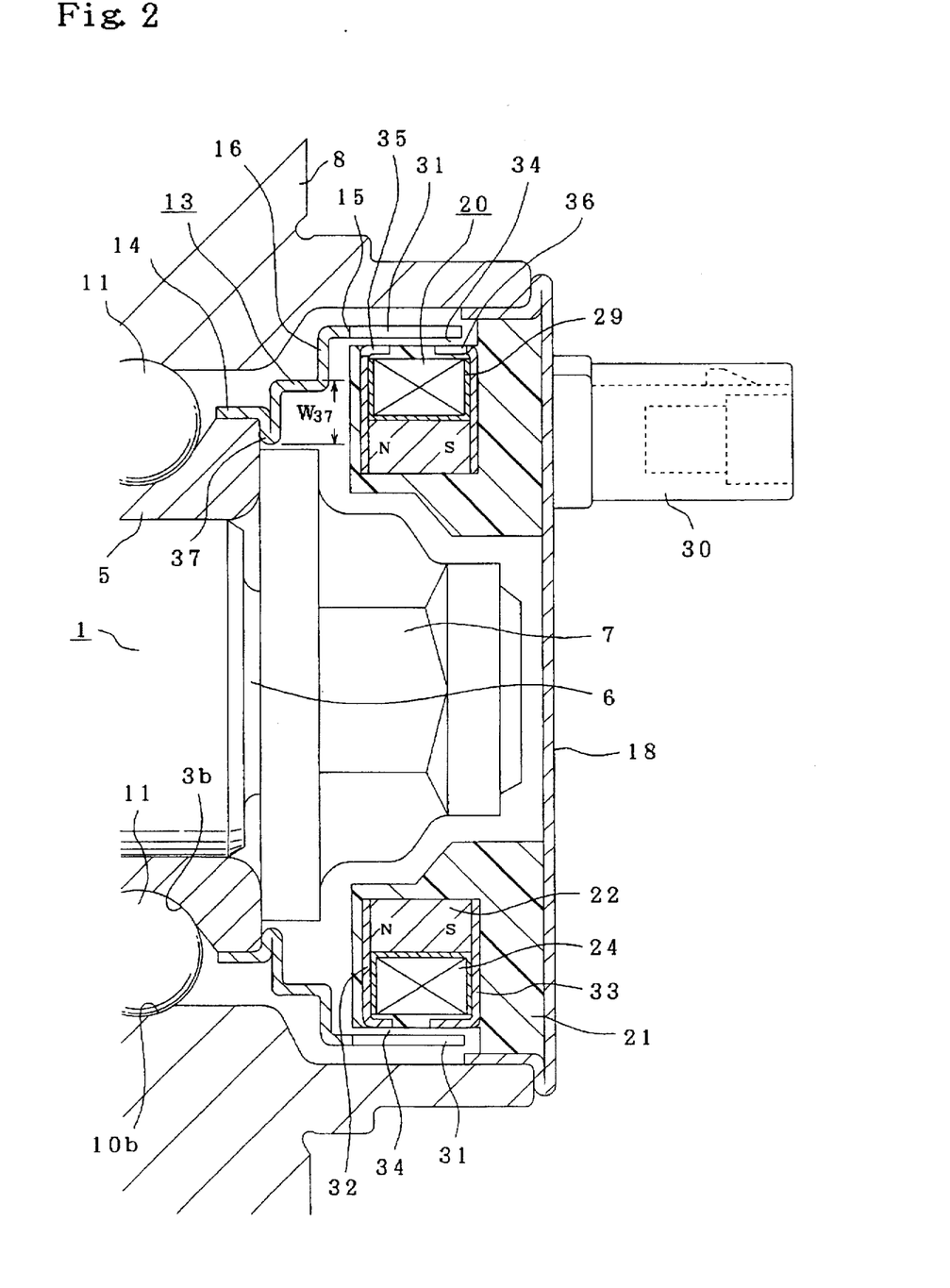
FIG. 2 is a cross sectional view of part of a rolling bearing unit showing a second embodiment of the present invention.

FIG. 2 shows a second embodiment of the present invention. In this embodiment, the engagement portion of the tone wheel 13 is formed by a flange portion 37, so that the smaller diameter portion 14 is changed in diameter across the flange portion 37.

Specifically, one half (left half in FIG. 2) of the smaller diameter portion 14 has a smaller diameter for fitting onto the inner ring member 5 while the other half (right half in FIG. 2) has a larger diameter for continuing to the stepped portion 16.

In this construction of the flange portion 37, the metal die for producing the flange portion 37 has a support face (corresponding to the right side face of the flange portion 37 in FIG. 2) such that the width dimension $W_{37}$ of the support face is large enough to reduce the stress which the metal die (receiving die) experiences upon producing the flange portion 37.

The other construction and operation are substantially the same as those of the first embodiment.

Figure 3:
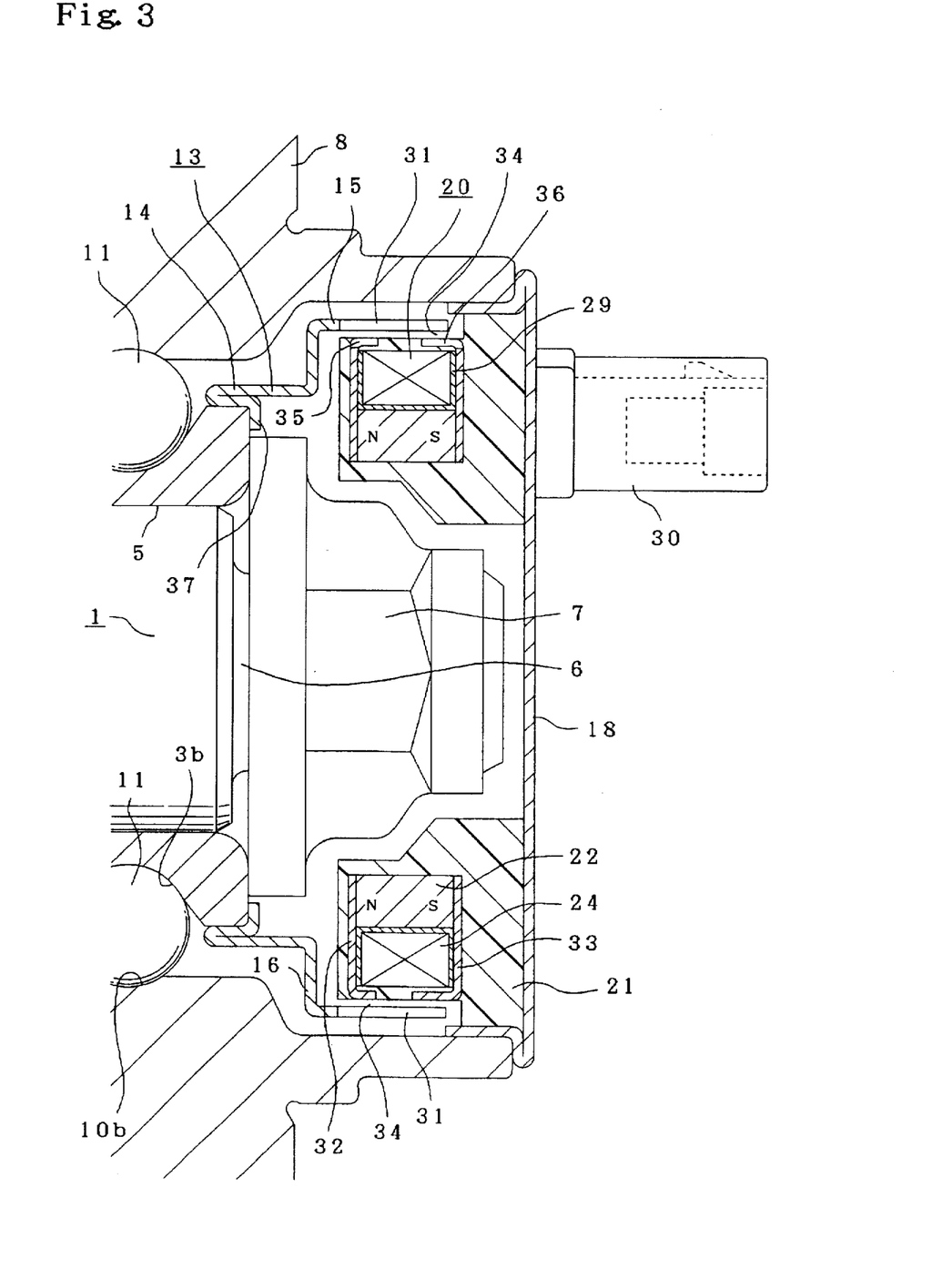
FIG. 3 is a cross sectional view of part of a rolling bearing showing a third embodiment of the present invention.

FIG. 3 shows a third embodiment of the present invention. In this embodiment, the tone wheel 13 having the smaller diameter 14 is made from a metal plate part of which is folded at 180 degrees at the axially outer edge of the smaller diameter portion 14 and further bent at right angles radially inward at its tip end portion to form the engagement portion or flange portion 37. In this embodiment, since the metal plate is not deformed by buckling, the process for forming the flange portion 37 is easily carried out.

The other construction and operation are substantially the same to those of the first and second embodiments.

Incidentally, the flange 37 does not necessarily have a circular inner periphery, but can have e.g. a petal shape inner periphery, or can be formed with a plurality of projections in a tab shape arranged circumferentially and abutted to the inner ring.

Figure 4:
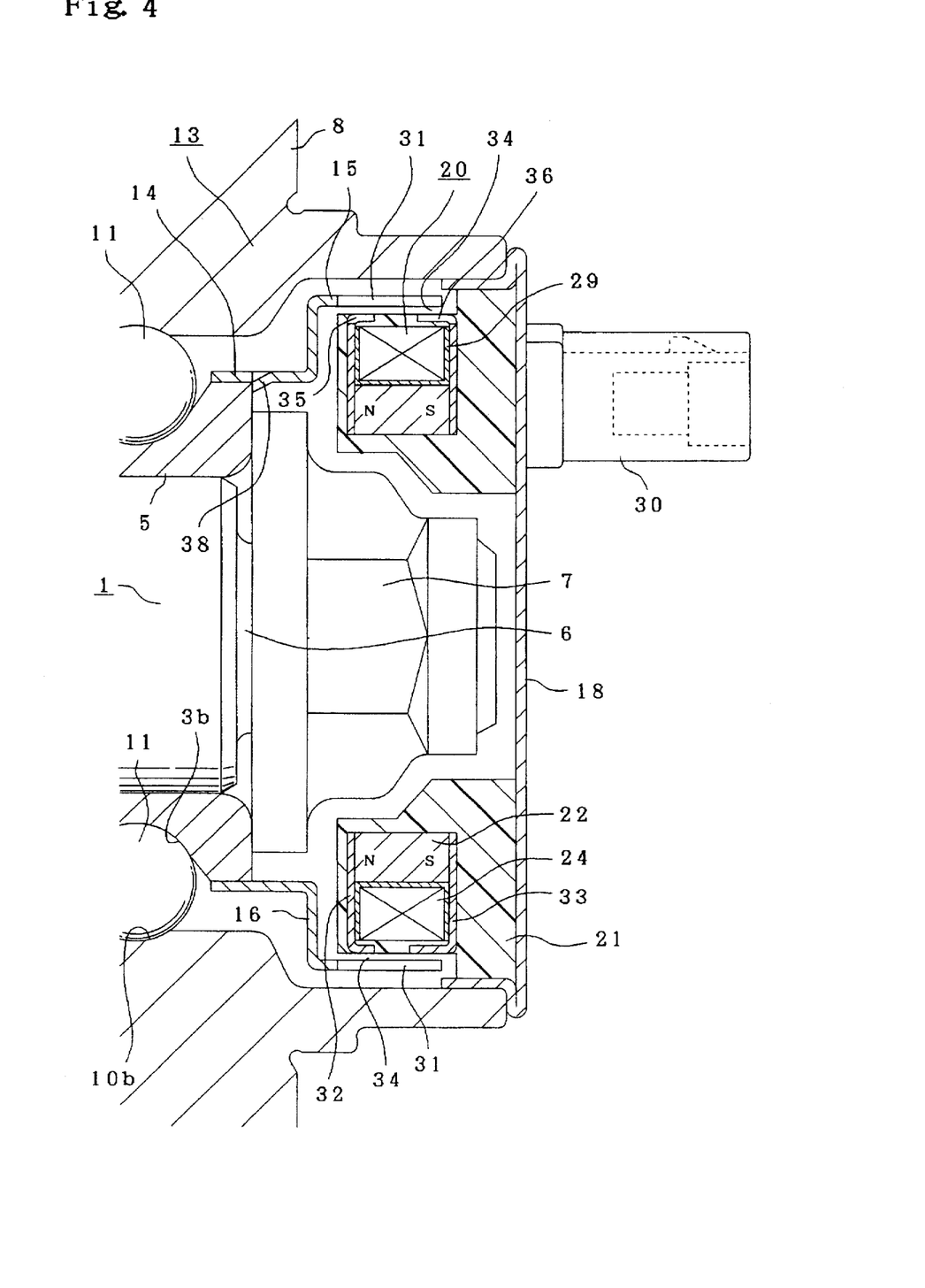
FIG. 4 is a cross sectional view of part of a rolling bearing showing a fourth embodiment of the present invention.

FIG. 4 shows a fourth embodiment of the present invention. In this embodiment, the tone wheel 13 having the smaller diameter portion 14 and the stepped portion 16 is made from a metal plate part of which is formed with a plurality of cuts on the same circle in the smaller diameter portion 14.

Specifically three or four cuts are formed with a uniform space therebetween in the circumferential direction. In addition, the portions adjacent to the cuts closer to the step portion 16 (right side portions in FIG. 4) are plastically deformed radially inwards so as to form projections 38.

The axially outer end face of the projections 38 formed by the cuts is abutted to the axially inner end face of the inner ring 5.

The other operation and construction are substantially the same to those of the first through third embodiments.

Figure 5:
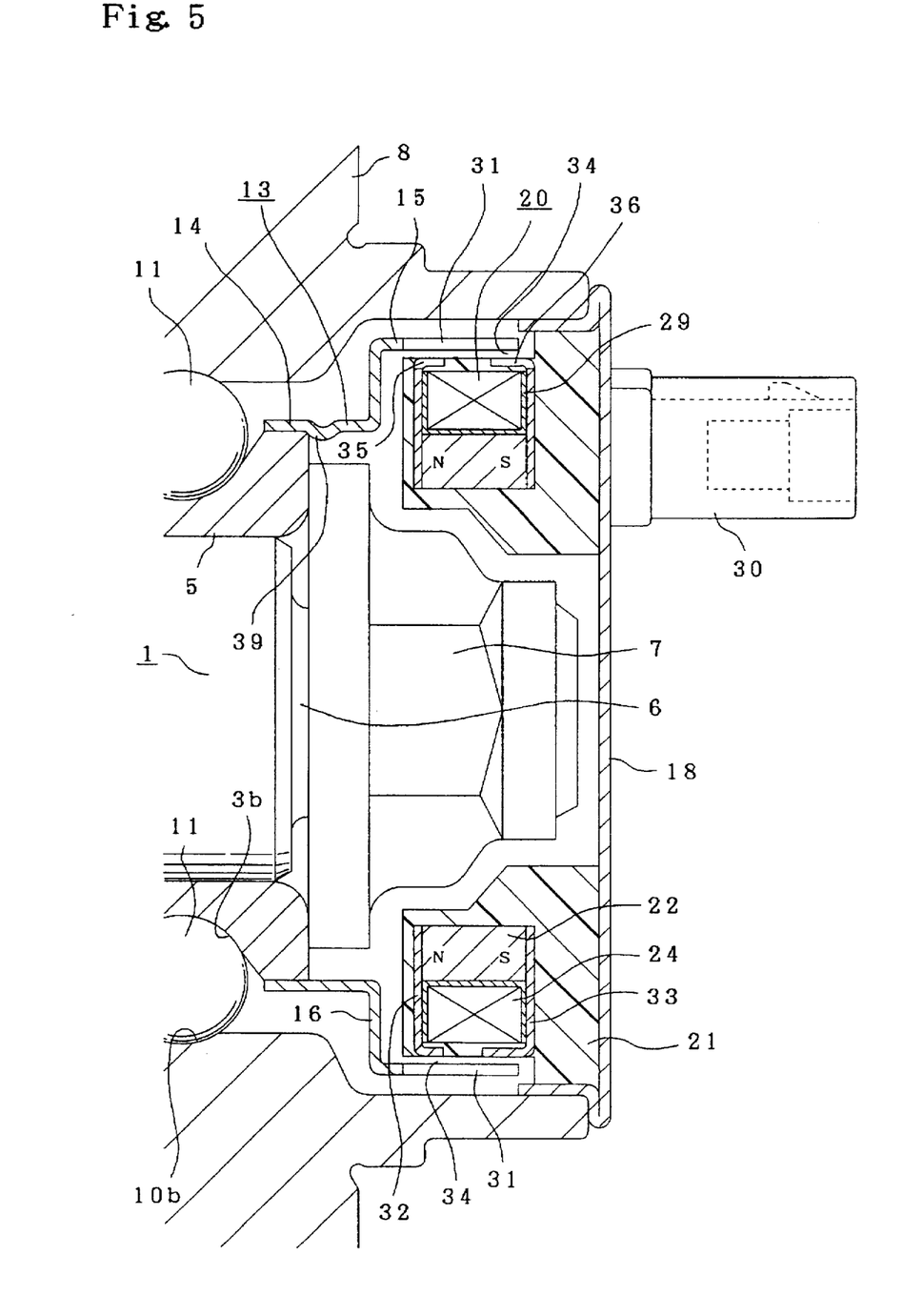
FIG. 5 is a cross sectional view of part of a rolling bearing showing a fifth embodiment of the present invention.

FIG. 5 shows a fifth embodiment. In this construction, the tone wheel 13 is made from a metal plate part of which is formed with projections 39 in an emboss shape for the engagement portions on the same circle, e.g. three or four projections 39 with a uniform space therebetween in the circumferential direction.

The projections 39 have their axially outer side face abutted to the axially inner end face of the inner ring 5.

The other construction and operation are the same to those in the first through three embodiments.

The rolling bearing units with rotating speed sensor of the embodiments of this invention as constructed above exhibit improved reliance in the high performance for installation in the compact vehicle.

Although the tone wheel in the above embodiments have a comb shape, it is possible to form various types of tone wheels, e.g. a row of through-holes, or an axially juxtaposed rows of through-holes. In addition, the sensor is not limited to an annular sensor, but can be arranged with a single pole sensor, active sensor. Further, the cover can be basically made from a synthetic resin and has an annular metal fitting portion insert molded for engagement with the outer ring member.

What is claimed is:

1. A rolling bearing unit with rotating speed sensor comprising a stationary outer ring member having an open end portion and an inner peripheral face formed with an outer ring raceway thereon, a rotatable inner ring member having an end portion and an outer peripheral face opposed to the inner peripheral face and formed with an inner ring raceway thereon, a plurality of rolling elements rotatably provided between the outer ring raceway and the inner ring raceway, a cylindrical magnetic tone wheel fixed to the end portion of the inner ring member and having a surface portion circumferentially formed with rotating cutouts with a uniform space therebetween, a cover comprising a synthetic resin block and a metal portion to be securely mounted to the open end portion of the outer ring member, and an annular sensor embedded in the synthetic resin block so as to be opposed to the tone wheel, the tone wheel having a cylindrical fixing portion fitted onto the end portion of the inner ring member and having an end edge, a cylindrical detecting portion having a diameter which is larger than that of the cylindrical fixing portion provided coaxial with the cylindrical fixing portion and having an end edge and a peripheral face on which the rotating cutouts are formed, and a stepped portion provided between the end edge of the smaller cylindrical fixing portion and the end edge of the larger cylindrical detecting portion, the cylindrical fixing portion having an inner peripheral face on which a plurality of engagement portions are arranged in a single circle to project radially inwards from the inner peripheral face, and the engagement portions having one side face abutted to the end face of the inner ring member, so that the tone wheel is positioned with reference to the inner ring member.

2. A rolling bearing unit with rotating speed sensor comprising a stationary outer ring member having an open end portion and an inner peripheral face formed with an outer ring raceway thereon, a rotatable inner ring member having an end portion and an outer peripheral face opposed to the inner peripheral face and formed with an inner ring raceway thereon, a plurality of rolling elements rotatably provided between the outer ring raceway and the inner ring raceway, a cylindrical magnetic tone wheel fixed to the end portion of the inner ring member and having a surface portion circumferentially formed with rotating cutouts with a uniform space therebetween, a cover comprising a synthetic resin block and a metal portion to be securely mounted to the open end portion of the outer ring member, and an annular sensor embedded in the synthetic resin block so as to be opposed to the tone wheel, the tone wheel having a cylindrical fixing portion fitted onto the end portion of the inner ring member and having an end edge, a cylindrical detecting portion having a diameter which is larger than that of the cylindrical fixing portion provided coaxial with the cylindrical fixing portion and having an end edge and a peripheral face on which the rotating cutouts are formed, and a stepped portion provided between the end edge of the smaller cylindrical fixing portion and the end edge of the larger cylindrical detecting portion, the cylindrical fixing portion having an inner peripheral face on which an engagement portion is extended in at least part of a single circle and projected radially inwards from the inner peripheral face, and the engagement portion having one side face abutted to the end face of the inner ring member, so that the tone wheel is positioned with reference to the inner ring member.

* * * * *